Figure 4:
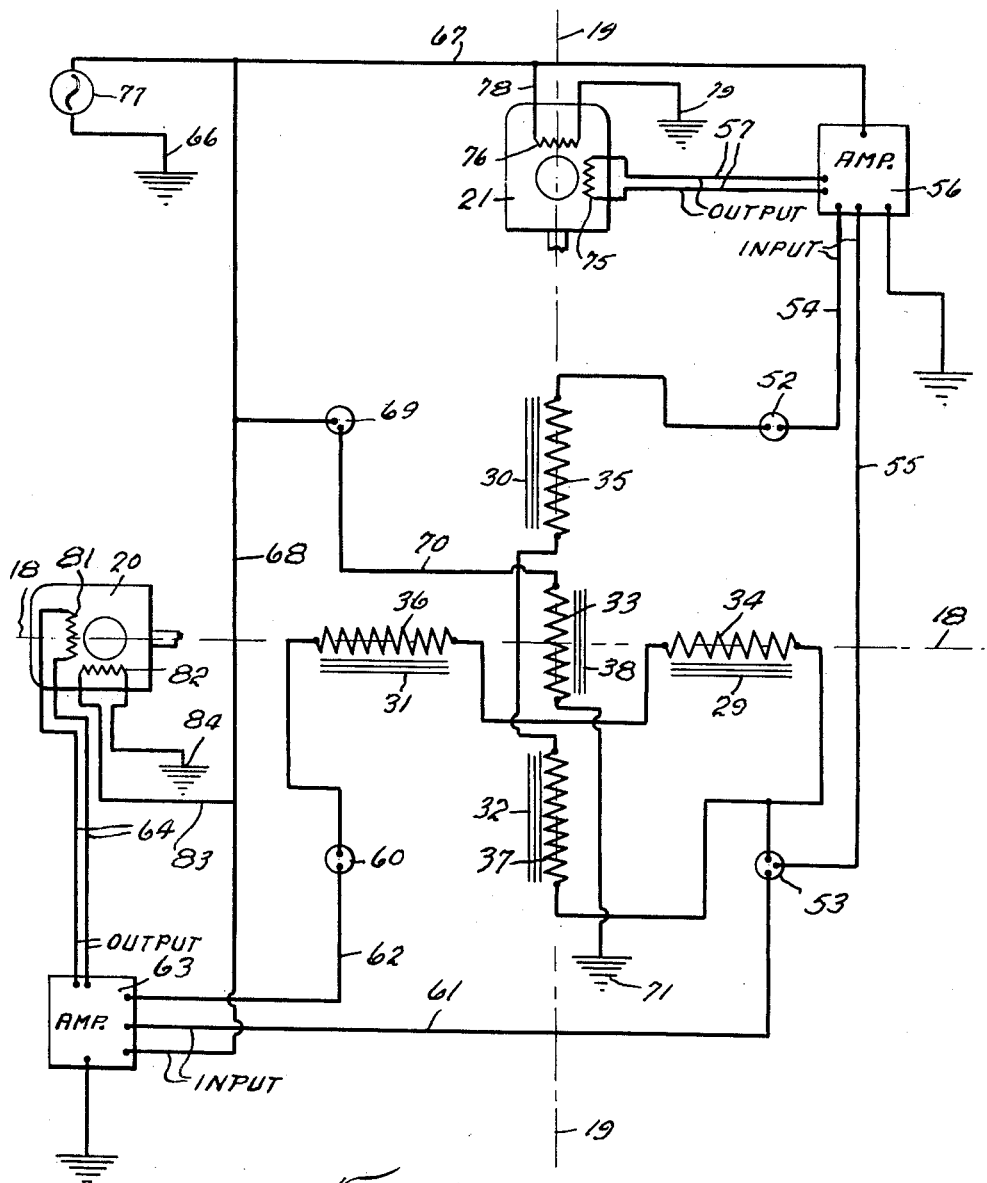

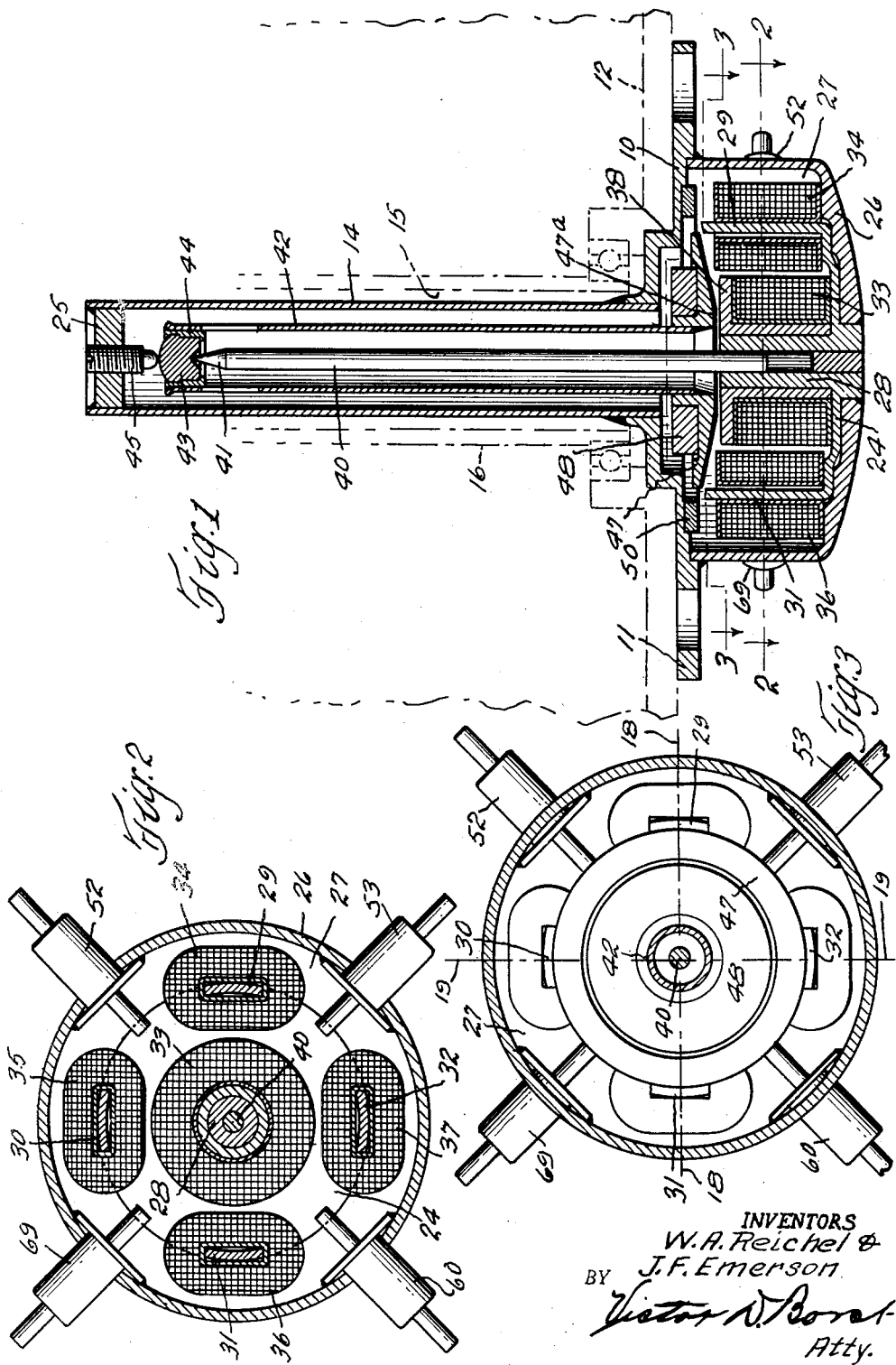

UNITED STATES PATENT OFFICE 2,516,912

GYRO ERECTING SYSTEM

Wladimir A. Reichel, Hackensack, and John F. Emerson, Hasbrouck Heights, N. J., assignors to Kearfott Company, Inc., New York, N. Y., a corporation of New York Application May 18, 1948, Serial No. 27,784

7 Claims. (Cl. 74—5.47)

This invention relates to vertical seeking reference systems and more particularly to a pendulum adapted to control the operation of gyro-erecting motors.

An object of the invention is to provide a pendulum construction wherein the pendulum produces an erecting force proportional to its displacement in a limited range and wherein the pendulum may be highly damped by immersion of the moving parts in oil so as to prevent too rapid a response to acceleration and deceleration forces.

Another object is to provide a pendulous erecting system which has its vertical seeking components sealed in a chamber containing fluid damping means.

A further object is to provide a simple and compact erecting system which may be contained physically within an axial chamber of a gyro rotor.

Various other objects and advantages will be apparent as the nature of the invention is more fully disclosed hereinafter.

In accordance with the present invention, a pendulum includes a suspended mass of magnetic material having a bottom surface disposed to swing over a plurality of radially disposed magnetic cores so as to vary the reluctance of different magnetic paths in accordance with the pendulum's deviation from true vertical. The differential effect of the reluctances of the various paths produces a signal which controls the gyro-erecting motors. The pendulum and the magnetic material and cores are enclosed in a casing which may be filled with oil or other liquid for damping purposes.

Although the novel features which are characteristic of this invention are pointed out more particularly in the claims, the nature of the invention will be better understood by reference to the following description, taken in connection with the accompanying drawings in which a specific embodiment has been set forth for purposes of illustration.

In the drawings:

Fig. 1 is a vertical section through an erecting pendulum embodying this invention;

Figs. 2 and 3 are transverse sections taken on the lines 2—2, and 3—3, respectively, of Fig. 1, and Fig. 4 is a schematic diagram of the electrical erecting circuits.

Referring to the drawings in more detail, the pendulum is shown as mounted in a housing comprising a plate 10 which is secured by flanges 11 to the bottom of a gyro housing 12, indicated by dash lines, and carries a tube 14 extending upwardly through a bore 15 in the gyro rotor 16.

Inasmuch as the gyro may be of standard construction the details thereof are not set forth herein. A gyro of the type illustrated in the copending application of Smith and Brigham, Serial No. 753,392, filed June 7, 1947, for Vertical Seeking Gyro may be used. It is to be understood that the gyro is mounted on suitable gimbals for movement about normal axes 18 and 19 (Fig. 4) and that erection motors 20 and 21 are disposed to apply precessing torques about the respective axes.

The top of the tube 14 is closed by a plug 25. The plate 10 carries a case 26 of non-magnetic material or magnetic material if needed for shielding, which forms a closed chamber 27 to receive the magnetic structures and pendulum to be described. A member of magnetic material comprising a central core 28, a bottom disc 24 and four peripheral cores 29, 30, 31 and 32 is secured in the case 26. Windings 33, 34, 35, 36 and 37 are disposed about the respective cores to form a central energizing winding and four radially spaced pick-up windings. A cap 38 of magnetic material is associated with the central core 28 to provide an annular pole face of comparatively large area. The cores 29, 30, 31 and 32 terminate in arcuate pole faces above the plane of the cap 38.

The case 26 carries a pin 40 which extends axially of the tube 14 and is formed with a point 41 at its top. A pendulum tube 42 is suspended from the point 41 by a jewel bearing 43 secured in a cup 44 held in the end of the tube 42. A screw 45 threaded in the plug 25 normally has a slight clearance from the bearing 43 but serves as a stop to prevent the bearing from unseating when the housing becomes inverted and then it serves as the pivot.

The pendulum tube 42 extends downwardly around the pin 40 and carries at its free end an annular disc 47 of magnetic material. An annular metallic ring 48 is mounted on the disc 47 to provide the desired pendulous mass. The lower surface of the disc 47 includes an inner horizontal surface 47a which is spaced from the cap 38 by a small clearance for full deflection of the pendulum. The surface 47a then tapers to a suitable clearance with the ends of the cores 29, 30, 31 and 32. The diameter of the disc 47 is such that, when suspended in central position, it slightly overlaps the inner edges of the cores 29, 30, 31 and 32. The surface 47a may be spherical with a radius equal to the distance from 47a to the pivot point.

Core 28 (including integral bottom disc 24 and peripheral core members 29, 30, 31 and 32), cap member 38, and disc member 47, have been described as made of magnetic material. Highly permeable alloys such as "Permalloy" and "Mumetal" have been found to be the most satisfactory.

A ring 50 of non-magnetic material attached to the plate 10 forms a stop to limit the movement of the disc 47. Ring 50 may be an integral part of the plate 10.

Winding 33 carried by the central core 28 and cap 38 is an exciting winding connected to a source of alternating current. It will be readily understood then, that the magnetic field set up by winding 33 forms a magnetic circuit including core 28, cap 38, disc 47, air gaps and the four parallel return paths through identical core members 29, 30, 31 and 32.

This magnetic circuit is employed for the induction in coils 34, 35, 36 and 37 of voltages varying in accordance with the reluctances of the several magnetic circuits due to the variable air gap space between disc 47 and each of the cores 29, 30, 31 and 32.

When the pendulum is vertical and at rest, disc member 47 lays symmetrically above cap 38 and core members 29, 30, 31 and 32 and the air gap between disc 47 and each of the cores 29, 30, 31 and 32 is identical; therefore the magnetic paths through core members 29, 30, 31 and 32 all have equal reluctance. However, when the pendulum is off-vertical disc 47 swings over to one side increasing the reluctance of the opposite path and producing a differential effect in the core windings which is a function of the displacement of the pendulum from center. This differential effect is utilized to actuate the erecting motors 20 and 21 as shown in Fig. 4.

Referring to Fig. 4, the coils 35 and 37 are shown as connected differentially in series between posts 52 and 53 which are in turn connected by leads 54 and 55 to a control amplifier 56. The control amplifier 56 is connected to supply exciting current to phase winding 75 of the two-phase erecting motor 21 by leads 57. Phase winding 76 is connected across the alternating current source 77 by virtue of leads 67, 78 and ground connections 66 and 79.

Coils 35 and 37 being differentially connected, voltages induced therein by virtue of exciting winding 33 will be in phase opposition and when equal voltages are induced (that is, when the pendulum is on true vertical and the air gaps between disc 47 and cores 29, 30, 31 and 32 are equal), the resultant voltage across coils 35 and 37 is zero, hence the voltage in phase winding 75 is zero and motor 21 is at rest. The direction and amount of the torque produced by the motor therefore are a function of the direction and amount of displacement of the pendulum along the vertical plane containing the axis 19.

Similarly, the coils 34 and 36 are connected differentially in series to posts 59 and 60 which are connected by leads 61 and 62 to a control amplifier 63, the output of which is connected by leads 64 to phase winding 81 of the two-phase erecting motor 20 which rotates about the axis 18. Phase winding 82 is connected across A. C. source 77 through leads 68, 83 and ground connections 66, 84. Power is supplied to the amplifiers 56 and 63 from source 77, one side of which is indicated as grounded at 66 and the other side of which is connected by leads 67 and 68 to the amplifiers 56 and 63, respectively. The lead 68 is also connected to a post 69 which is connected by a lead 70 to one side of the center coil 33, the other side of which is grounded at 71.

It will be seen that the coil 33 constitutes the exciting winding for the magnetic circuit and that voltages will be induced in the windings 34, 35, 36 and 37 which vary in accordance with the flux threading the various coils, which in turn depends upon the position of the pendulum disc 47. In this way precessing torques are produced which tend to keep the pendulum erected.

When the pendulum and erecting system above described is used in a gyro-vertical system, the motors 20 and 21, will obey off-vertical signals from the pendulum through the novel electromagnetic circuit which is the subject matter of the present invention, so that the gyro may be restored to the vertical.

The novel pendulum electro-magnetic erection circuit and torquing system herein described does not depend on the use of a gyro to indicate the vertical and to restore the pendulum to true vertical, and it is an important feature of the invention that the pendulum itself may be used as a vertical reference. The pendulum herein described, being sealed in a damping fluid can be given sufficient period, depending upon the viscosity of the damping fluid, to permit its use as a vertical reference even under conditions of acceleration as are encountered in aircraft.

Although a specific embodiment has been shown for purposes of illustration, it is to be understood that the invention is capable of various uses and that changes and modifications may be made therein as will be readily apparent to a person skilled in the art. The invention is to be restricted only in accordance with the scope of the following claims.

What is claimed is:

1. In a vertical seeking system, a closed pendulum housing comprising a case forming a chamber and a tube extending upwardly therefrom, a pin fixed to said case and projecting upwardly in said tube, a magnetic member in said case having a central upwardly projecting pole piece and a plurality of outer upwardly projecting pole pieces peripherally displaced therearound, a pendulum comprising a tube having a bearing at its upper end hung on said pin for pivotal movement and a magnetic member carried by the lower end of said last tube adapted to close the magnetic paths between said central pole pieces and said outer pole pieces, said last magnetic member having a surface spaced from said outer pole pieces to form gaps which are varied as the pendulum swings in said case.

2. In a vertical seeking system as defined in claim 1, an energizing winding on said central pole piece, pick-up windings on said outer pole pieces, erecting motors connected to apply erecting forces to said housing about the coordinate axes of the system and channels connecting opposite sets of pick-up windings to control the operation of said erecting motors in accordance with the differential effect thereof so as to maintain said housing in erect position.

3. A vertical seeking system as set forth in claim 1 in which said second magnetic member comprises a disc having a diameter corresponding to the spacing of said outer pole pieces and adapted normally to hang centrally thereof.

4. A vertical seeking system as set forth in claim 3 in which said disc has a horizontal lower surface registering with said central pole piece and tapering toward the periphery to swing over said outer pole pieces.

5. A vertical seeking system as set forth in claim 1 in which said housing is oil filled for damping said pendulum.

6. In a vertical seeking system as set forth in claim 1, a gyro housing having a central vertical bore therein, said pendulum housing being mounted below said gyro housing with said first tube extending upwardly in said bore.

7. A vertical seeking system comprising a pendulum mounted for oscillation in any direction, said pendulum including an elongated tubular member pendulously weighted at one end, an elongated pin member pivotally supporting said pendulum, a base member, means for mounting said pin member to said base member, said base member being adjustable horizontally about co-ordinate axes centered at the vertical axis of said pendulum, torquing means associated with each of said axes to shift said base member therein, and means for energizing said torquing means in accordance with departures of said base member from said vertical axis to restore said base member to said vertical axis.

WLADIMIR A. REICHEL.
JOHN F. EMERSON.

REFERENCES CITED

The following references are of record in the file of this patent:

UNITED STATES PATENTS

| Number | Name | Date |
| --- | --- | --- |
| 1,679,354 | Fairchild | Aug. 7, 1928 |
| 1,726,643 | Borresen | Sept. 3, 1929 |
| 2,367,465 | Kunzer | Jan. 16, 1945 |
| 2,392,370 | Esval et al. | Jan. 8, 1946 |
| 2,446,180 | Haskins, Jr. | Aug. 3, 1948 |